Figure 3:
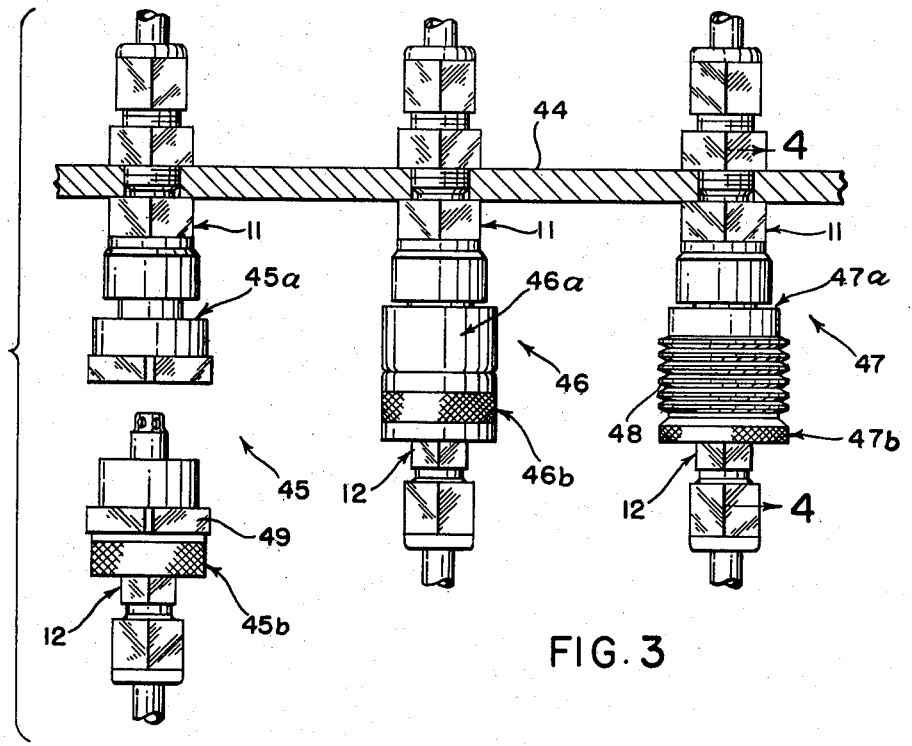

Feb. 23, 1965
Z. SZOHATZKY
3,170,667
QUICK CONNECT SYSTEM
Filed Nov. 4, 1963
3 Sheets-Sheet 1
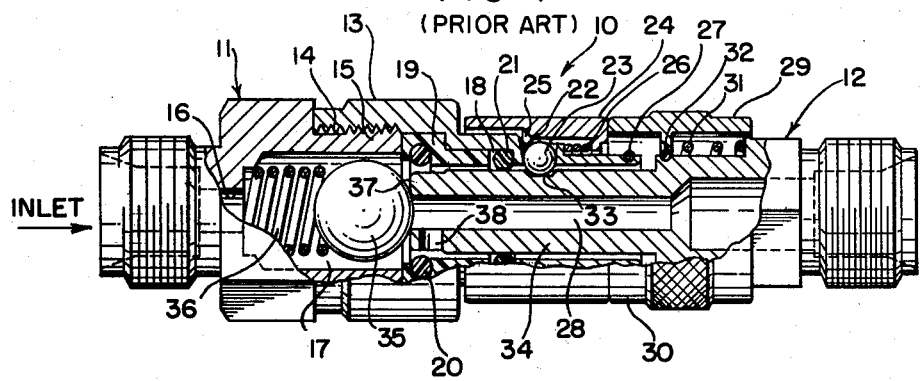
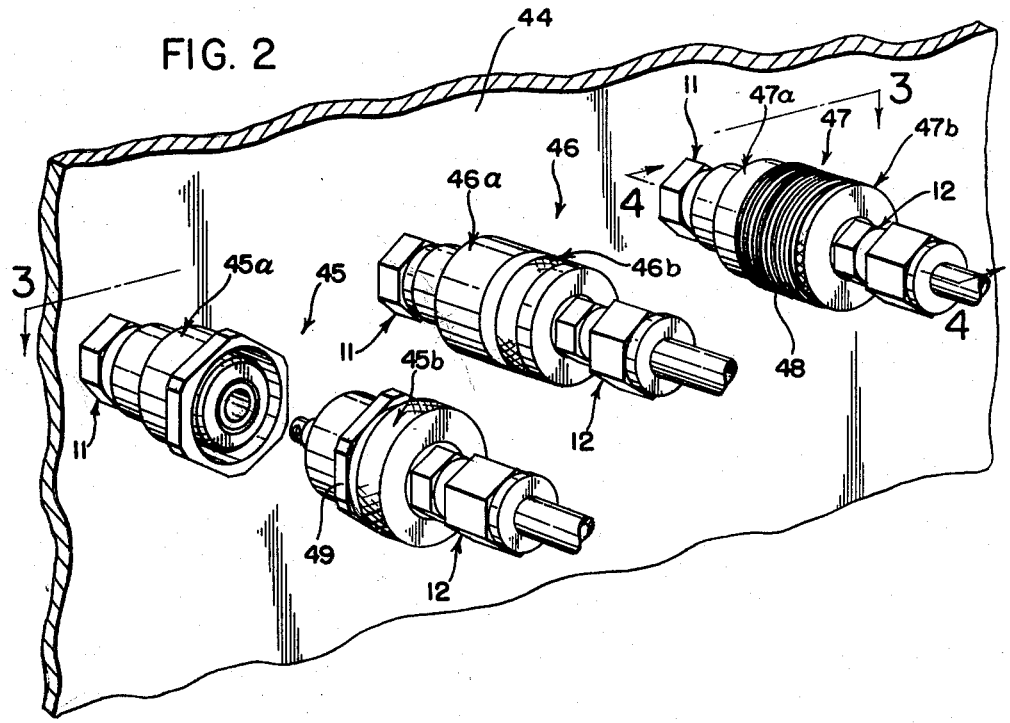
INVENTOR.
ZOLTAN SZOHATZKY
BY
*Fay & Fay*
ATTORNEYS Feb. 23, 1965

Z. SZOHATZKY 3,170,667

QUICK CONNECT SYSTEM

Filed Nov. 4, 1963

3 Sheets-Sheet 2

INVENTOR.
ZOLTAN SZOHATZKY
BY
*Fay & Fay*
ATTORNEYS

Feb. 23, 1965     Z. SZOHATZKY     3,170,667
QUICK CONNECT SYSTEM

Filed Nov. 4, 1963     3 Sheets-Sheet 3

INVENTOR.
ZOLTAN SZOHATZKY
BY
*Fay & Fay*
ATTORNEYS

United States Patent Office 3,170,667
Patented Feb. 23, 1965

3,170,667
QUICK CONNECT SYSTEM
Zoltan Szohatzky, Mentor, Ohio, assignor to Crawford Fitting Company, Cleveland, Ohio, a corporation of Ohio
Filed Nov. 4, 1963, Ser. No. 321,122
8 Claims. (Cl. 251—149.6)

This invention relates to couplings for a fluid handling system, and more particularly to safety means assuring the proper utilization of the couplings in the fluid system.

Various types of so-called quick connect couplings have become well known in the field of fluid handling. These couplings are designed to enable the rapid connection of a particular mechanism to a source of fluid supply and have found a wide variety of uses. One prominent use of quick connect couplings has been in panel board installations where a plurality of fluid lines are to be connected to several different devices. An example of this is an instrumentation set up where pressure lines run from a particular machine to a panelboard where they are connected through quick connect couplings to a series of measuring devices. Another example of the use of these couplings is to be found in connection with hospitals where various gases, such as oxygen and anesthetics, are provided and quick connect couplings are used to couple the particular gas with the particular type of equipment. These examples are purely illustrative and it is believed obvious that quick connect couplings may be used and are used in other and diverse areas.

A problem has arisen in the area of quick connect coupling systems in that care must be exercised to assure that each particular item of equipment is connected to the proper source of fluid. Caution is needed most in the area of panelboards where a multitude of couplings are mounted on the same board, only one of which is proper for a particular piece of equipment. Failure to couple the particular equipment to the proper outlet may result in a ruined instrument, or, in the case of hospitals, more serious consequences.

Various solutions have been offered to remedy the problem. These solutions generally have taken the form of color codes, labels and non-interchangeable quick connects. An example of the non-interchangeable quick connect is the so-called keyed quick connect in which the male and female members of the coupling have a mating projection and recess, respectively. The coupling parts may be inter-connected only upon insertion of the proper size projection into the mating recess.

Two problems arise from such an arrangement. First, it is necessary to align the projection with the recess before the male and female members may be interconnected. Secondly, should one of the mating members, for some reason, not be available a standard coupling member may not be utilized. Thus, for example, should the coupling member connected to an oxygen outlet be of the keyed quick connect type while the coupling member on an oxygen tent be of a standard type, it would be impossible to connect the oxygen tent to the supply of oxygen.

It is an object of this invention to provide a non-interchangeable quick connect coupling.

It is a further object of this invention to provide a coupling wherein only the male and female members having compatible mating means may be interconnected.

It is a still further object of this invention to provide a non-interchangeable quick connect coupling system, wherein any male or female member without a mating means may be connected to a corresponding female or male member with mating means.

It is another object of this invention to provide a non-interchangeable quick connect coupling, wherein the female member includes an external sleeve having a groove co-operating with mating means on the male member.

It is a further object of this invention to provide a quick connect coupling wherein the female member includes a grooved sleeve mounted externally thereof and the male member includes an external sleeve having a flange mating with said grooved sleeve on the female member.

It is a more specific object of this invention to provide a plurality of quick connect couplings wherein each of the couplings are provided with mating circular tongue and groove sleeves of a diameter different from the tongue and groove sleeves of every other coupling in the system.

Other objects and aspects of the invention will become apparent upon a complete perusal of the specification.

Figure 4:
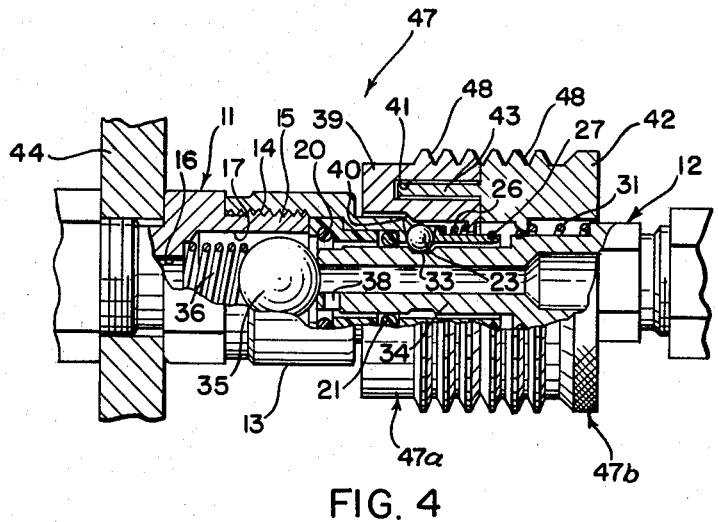
Figure 5:
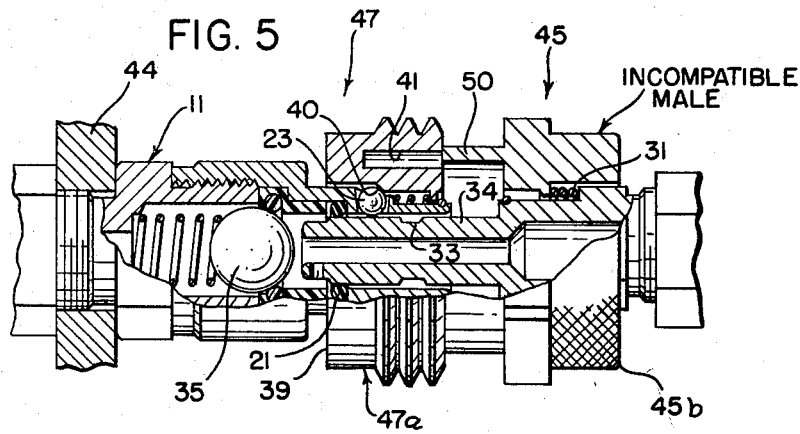
Figure 6:
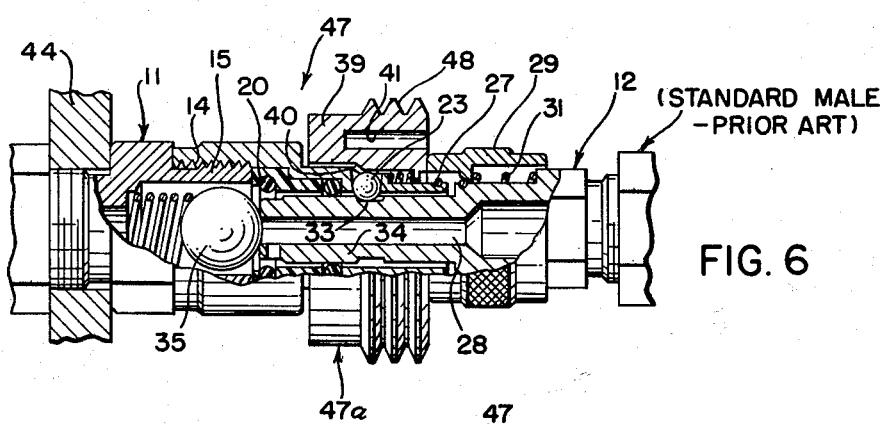
Figure 7:
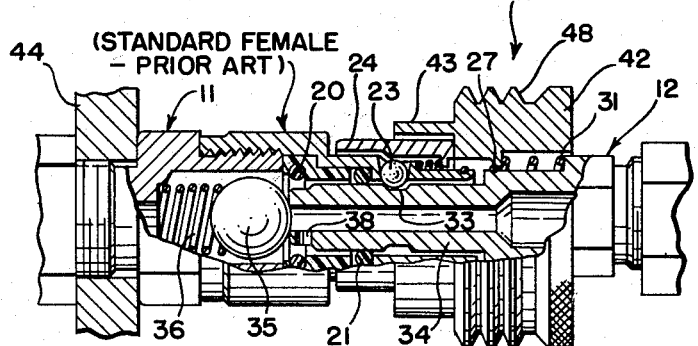

In the drawings:
FIG. 1 is a cross-sectional view of a known type of quick connect coupling;
FIG. 2 is a perspective view of a plurality of quick connect couplings embodying the instant invention mounted on a panelboard;
FIG. 3 is a view taken along line 3—3 of FIG. 2;
FIG. 4 is a view taken along line 4—4 of FIG. 2;
FIG. 5 is a sectional view of the male and female member embodying the instant invention with the male member having an incompatible mating means;
FIG. 6 is a sectional view of a female member embodying the instant invention coupled with a standard male member; and
FIG. 7 is a sectional view showing a standard female member coupled to a male member including the instant invention.

Turning to FIG. 1, there is illustrated a known type of quick connect coupling generally indicated by the reference numeral 10. The coupling includes a female member 11 and a male member 12. The female member 11 includes a collar 13 which is threaded as shown at 14 to the forward portion 15 of the female member 11. The member 11 is internally bored as at 16 and 17, with the bore 17 being larger in diameter than the bore 16.

Internally of the collar 13 there is a recess portion 18, in which is frictionally secured a member 19. The member 19 serves to retain an O-ring seal 20, which is seated in a groove formed in such member. A second O-ring seal 21 is also retained within the collar 13. The collar 13 further includes a plurality of tapered radial openings, one of which is shown at 22, in which ball detents 23 are disposed. An annular ring 24 is slideably received on the collar 13 and includes a tapered surface 25. A coil spring 26 is interposed between surfaces on the sleeve 13 and the ring 24 with a snap ring 27 secured to the outer end of the collar 13 thereby to restrain the longitudinal movement of the ring 24 under the bias of the spring 26.

Turning to the male member of the coupling shown in FIG. 1, there is provided a central bore 28 extending longitudinally through the male member. A slideable sleeve 29 is mounted on the exterior of the male member 12 and includes a forward portion 30 which is adapted to abut the ring 24. A coil spring 31 is interposed between a surface on the sleeve 29 and a surface on the body of the male member 12 and biases the sleeve 29 into a forward position. The strenth of spring 31 is greater than that of spring 26. A snap ring 32 serves as a limiting means to restrain the movement of the sleeve 29 under the bias of the spring 31.

An annular groove 33 is provided in the periphery of an extended portion 34 of the male member 12. The groove 33 is adapted to receive the ball detents 23 carried by the collar 13 thereby to secure the female and male members 11 and 12 in a connected position. Disposed in the bore 17 of the female member 11 is a ball 35 and a coil spring 36. The spring 36 normally biases the ball 35 against the O-ring 20, thereby sealing the female member. Upon insertion of the male member 12 into the female member, the end 37 of the extended portion 34 abuts the ball 35 and displaces the ball from the seal 20, thereby allowing fluid to flow through the inlet ports 38, through the bore 28 and out of the coupling.

The male member is retained within the female member by virtue of the ball detents 23 being received in the annular groove 33. The ball detents 23 are displaced radially inwardly into the groove 33 through coaction between the sleeve 29 and the ring 24. Upon insertion of the male member into the female member the sleeve 29 abuts the ring 24 and, since the strength of the spring 31 is greater than the strength of spring 26, the sleeve 29 forces the ring 24 to move longitudinally of the collar 13. Longitudinal movement of the ring 24 causes the surface 25 on the ring 24 to cam the balls 23 inwardly into the groove 33. The ring 24 is retained in the displaced position due to the greater strength of the spring 31. The release of the coupling is accomplished by retracting the sleeve 29 against the bias of spring 31 which allows the spring 36 to return the ring 24 to its original position. With the ring 24 in its original position, the male member 12 may be withdrawn since the ball detents 23 are no longer retained in the groove 33. Upon withdrawal of the male member, the ball 35 is again seated on the O-ring 20 and the flow of fluid is halted.

Turning to FIG. 4 there is illustrated a modification of the prior art coupling shown in FIG. 1 which modification constitutes the instant invention. The same reference numerals have been used to identify the parts which are identical to those in FIG. 1. Thus the female member 11 includes all of the parts shown in FIG. 1 with the exception that a ring having a different configuration than the ring 24 is utilized in the modification. The modified ring 39 includes a surface 40 similar in function and shape to the surface 25 on the ring 24. The ring 39 also includes a groove 41 of circular configuration.

The male member of the modification is similar in all respects to the male member 12 shown in FIG. 1 with the exception that the sleeve 42 differs from the sleeve 29. The sleeve 42 is provided with an outwardly extending flange portion 43 which is circular in configuration and is adapted to be received in the groove 41 of the ring 39.

With the modified arrangement shown in FIG. 4 the coupling functions in a manner similar to that shown in FIG. 1. Thus insertion of the extension 34 into the female member 11 will cause the ball 35 to be depressed from the O-ring 20 and thereby allow the flow of fluid through the ports 38. The extension 34 is retained within the female member 11 by virtue of the ball and groove arrangement 23, 33. The ball detents 23 are caused to enter the groove 33 by virtue of the flange 43 being received within the groove 41 in the ring 39 thus allowing the sleeve 42 to abut the ring 39. Due to the greater strength of the spring 31, relative to the spring 26, the ring 39 is moved longitudinally causing the surface 40 to cam the ball detents 23 into the groove 33 and thereby retain the male member within the female member.

It should be noted that flange 43 is illustrated in FIG. 4 as being of a length slightly less than the depth of the groove 41. This relationship, within limits, is not critical for the proper operation of the coupling; however, should the length of the flange 43 exceed the depth of the groove 41, the ring 39 and sleeve 42 would be separated when the coupling was connected and would present an undesirable appearance. A more critical limitation on the length of the flange will be discussed below.

Turning to FIGS. 2 and 3 there is illustrated a plurality of couplings 45, 46, 47 with coupling 47 being that shown in FIG. 4. The couplings are mounted on a panelboard 44 with the female members 45a, 46a, 47a secured to the panelboard and the male members 45b, 46b, 47b connected to the female members. An arrangement as shown in FIG. 2 illustrates the problem that has arisen in the area of couplings secured to a common panelboard. Thus an operator desiring to connect one of the male members with a female member must exercise care to assure that the proper female member in which to insert the male member is selected. Although color codes and labelling are one means of remedying the problem, the solution is far from foolproof since even color codes and labels may be ignored or unrecognized.

The modified couplings shown in FIG. 4 present a means whereby it is physically impossible to interconnect the wrong male member with the female member. This is accomplished by making the flange and groove portions on the sleeves of each coupling of a diameter different from the diameter of the flange and groove on every other coupling. An added indicium may be provided externally on the sleeves to aid in identifying the mating male and female members. Thus the coupling 47 shown in FIG. 4 has a series of grooves externally on the male and female members, the grooves being identified as 48. The coupling 46 is provided with a smooth external surface, whereas the coupling 45 is provided with mating hexagonal portions 49.

Turning to FIG. 5, the principles of the invention are illustrated by the male member of the coupling 45 being inserted into the female member of the coupling 47. As it may be clearly seen in FIG. 5, the extending flange 50 on the male member 45b is of such a diameter that it is incapable of entering the circular groove 41 in the female member. When the flange 50 abuts the ring 39, the groove 33 in the extended portion 34 has not reached a position where it might receive the ball detents 23. The result is that the camming action of the surface 40 on the detents 23 is to no avail and the ring 39 is effectively locked in position. Should the male member continue to be inserted into the female member, the sleeve carrying the flange 50 will cause the spring 31 to be compressed. By making the flange 50 of sufficient length, the spring 31 will be completely compressed before the extended portion 34 has reached the ball 35. This condition is shown in FIG. 5. Obviously, once the spring 31 is fully compressed it is impossible to continue inserting the male member into the female member.

It is believed apparent that the relationship between the length of the flange, the length of the extended portion of the male member and the height of the spring on the male member determines the proper functioning of the safety device described above. Thus, should the flange 50 be of a length substantially less than that shown in FIG. 5, the groove 33 would reach a detent receiving position before the spring 31 was fully compressed and the coupling would be fully connected. Similarly, even if the flange 50 is of the length shown in FIG. 5, should the extended portion 34 be substantially lengthened the coupling again would be connected before the spring 31 was fully compressed. Finally, assuming the flange 50 and the extended portion 34 are the length shown in FIG. 5, the safety feature would not function properly if the height of the spring were substantially increased since this would allow greater penetration of the male member before the spring was compressed.

With the arrangement above disclosed, even if the operator should confuse the colors or the labels, he will be physically restrained from inserting a male member into an incompatible female member. This obviously is of considerable importance when an entire panelboard contains a multiplicity of couplings such as these thus greatly magnifying the chances for error. Yet, great as the need for an absolute safety device might be, there are innumerable times when a standard fitting not having the proper mating flange or groove is to be coupled to the associated member. With the systems of the prior art, it has been necessary to remove the standard male or female fitting and replace it with a male or female member that will co-operate with the particular safety configuration on the associated member. The device here illustrated removes the necessity for such an operation.

Turning to FIG. 6, there is illustrated a standard male member 12 of the type shown in FIG. 1 received in the modified female member shown in FIG. 4. This may be accomplished by virtue of the absence of the protruding flange member on the sleeve 29 associated with the male member. Since the flange is not present, the coupling functions as in FIG. 1 and it is possible to insert the extended portion 34 to a position wherein the ball detents 23 may be cammed downwardly into the groove 33. As pointed out in the discussion relating to FIG. 5, should there be a flange present on the sleeve associated with the male member, the flange is ordinarily of such an axial extent that the spring 31 would have been compressed before the groove 33 might be aligned with the ball detents 23.

Turning to FIG. 7, there is illustrated a modified male member shown in FIG. 4 inserted into a standard female member of the type shown in FIG. 1. Although the flange 43 is present on the sleeve associated with the male member, the flange 43 is of such a diameter that it encircles the standard ring 24 on the female member so that the flange is inoperative in so far as preventing the coupling operation of the male and female members.

An example will illustrate the advantages of the versatility that is available in the coupling shown in FIG. 4. Assuming the couplings are to be utilized in a hospital, as an example, and an emergency should arise wherein it is necessary to place the patient in an oxygen tent, should the oxygen tent for any reason have a standard male or female member it would still be possible to connect the oxygen tent to a supply of oxygen even though the oxygen outlet has been modified to incorporate the safety system disclosed herein.

Obviously, the disclosed invention is not limited to applications wherein the couplings are mounted on a panelboard. The couplings might be used in any application where it is desired to assure the proper coupling of the female and male members.

The present embodiment is to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a fluid system comprising a plurality of fluid sources, fluid-operated devices and couplings;
said couplings being composed of separable male and female members;
one of said members of each coupling being adapted to be connected to a separate fluid supply;
the other of said members of each of said couplings being adapted to be connected to a device utilizing a particular fluid supply;
a safety system to assure the proper connection of the male and female members of each coupling so that the device will be connected to the proper fluid supply;
said safety system comprising mating means on each of said male and female members;
the mating means for the male and female members of each valve being different from the mating means of the male and female members of every other valve, whereby a female member having a particular mating means may not be connected to a male member having a different mating means and vice versa;
said mating means including means whereby any male or female member not having a mating means may be connected to a corresponding member having mating means.

2. In a fluid system having a plurality of couplings;
said couplings being composed of separable male and female members;
one of said members of each coupling being adapted to be connected to a separate fluid supply;
the other of said members of each of said couplings being adapted to be connected to a fluid mechanism;
a safety system to assure the proper connection of the male and female members of each coupling so that the mechanism will be connected to the proper fluid supply;
said safety system comprising mating means on each of said male and female members:
the mating means for the male and female members of each coupling being different from the mating means for the male and female members of every other coupling whereby a female member having a particular mating means may not be connected to the male member having a different mating means and vice versa;
said mating means including means whereby any male or female member not having a mating means may be connected to a corresponding member having mating means.

3. The fluid system of claim 2 wherein said male and female members have sleeves mounted thereon;
said sleeves for the male and female members of each coupling including mating flange and groove means, respectively.

4. A coupling comprising separable male and female members;
one of said members including fluid control means therein;
said male member including an elongated portion receivable in a bore in said female member and operable to actuate said fluid control means;
detent means on said female member;
a first sleeve slidably mounted on said female member and being operable to control said detent means;
a groove on said elongated portion of said male member adapted to receive said detent means in one position thereof;
a second sleeve slidably mounted on said male member;
a longitudinally extending flange on said second sleeve;
a recess in said first sleeve adapted to receive said flange.

5. A system of couplings comprising:
a plurality of couplings;
each of said couplings comprising separable male and female members;
one of said members including fluid control means in a bore therein;
each male member including an elongated portion receivable in a bore in said female members and operable to actuate said fluid control means;
detent means on each of said female members;
a first sleeve slidably mounted on each of said female members and being operable to control said detent means;
a groove on said elongated portion of each of said male members adapted to receive said detent means in one position thereof;
a second sleeve slidably mounted on each of said male members;
a longitudinally extending flange on each of said second sleeves;
a recess in each of said first sleeves;
each of said flanges and recesses being so formed that each flange is receivable in only the one recess having the same configuration thereby assuring the proper mating of each male and female member.

6. A system of couplings comprising:
a plurality of couplings;
each of said couplings comprising separable male and female members;
each female member including a bore therein;

each male member including an elongated portion receivable in the bore of one of said female members;
detent means on each of said female members;
a groove on said elongated portion of each of said male members adapted to receive said detent means in one position of said male member;
a first sleeve slidable on each of said female members and being operable to displace said detent means into said groove;
a second sleeve slidably mounted on each of said male members;
spring means biasing each of said second sleeve to a first position;
mating flange and recess means on the sleeves of said male and female members of each of said couplings;
said flange and recess means of each of said couplings being different from the flange and recess means of every other coupling in the system;
the dimensions of said flange, said elongated means and said spring means of each male member being such that should the flange not be received in the recess in the sleeve on said female member, said spring means will be fully compressed before the groove in said elongated portion is in said position to receive said detents.

7. A coupling comprising:
separable male and female members;
one of said members including fluid control means therein;
said male member including an elongated portion receivable in a bore in said female member and operable to actuate said fluid control means;
detent means associated with said female members;
a groove on said elongated portion of said male member adapted to receive said detent means in one position thereof;
recess means formed in one of said members; and
projecting means carried by the other of said members with the dimension of said projecting means being substantially equal to the dimension of said recess means whereby said projecting means is receivable in said recess means.

8. The coupling of claim 7 wherein the radial, axial and circumferential locations of each of said recess means and said projecting means on said members are such that said projecting means is receivable in said recess means when said male member is inserted in said female member.

References Cited in the file of this patent
UNITED STATES PATENTS
3,108,825   MacDonald _____ Oct. 29, 1963